Feb. 2, 1965    F. DURAND    3,167,975
DEVICE FOR TRANSMITTING MOTION TO A GEAR
Filed July 31, 1962    2 Sheets-Sheet 1
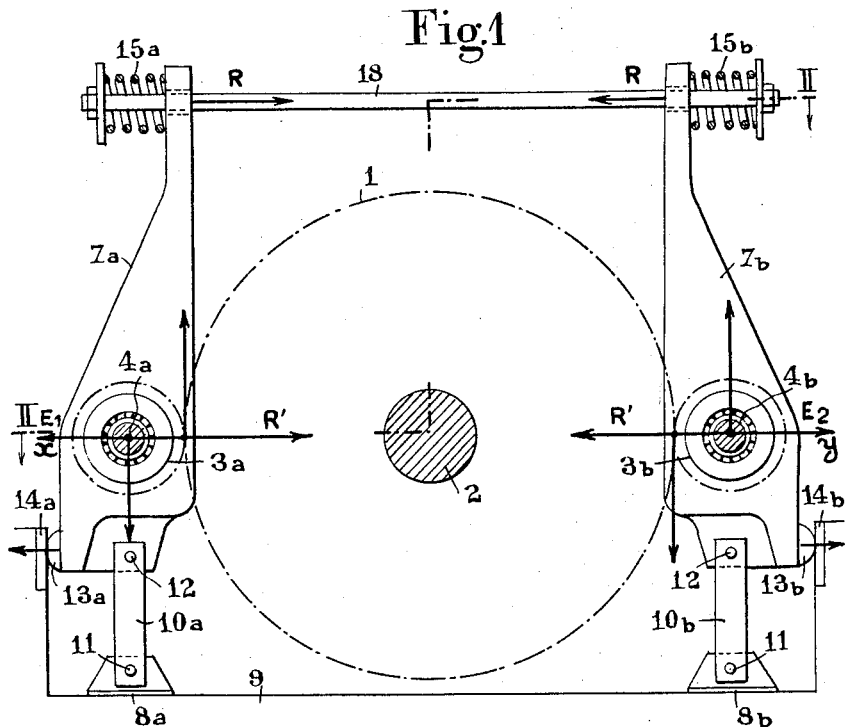
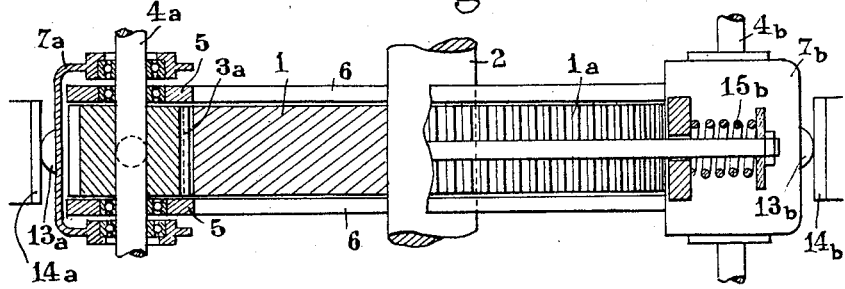
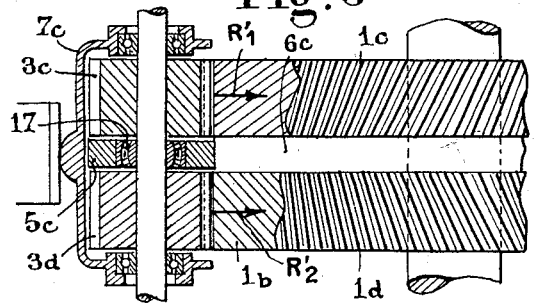
Inventor:
François Durand
by:
Michael S. Striker
Atty Feb. 2, 1965　　　　F. DURAND　　　　3,167,975
DEVICE FOR TRANSMITTING MOTION TO A GEAR
Filed July 31, 1962　　　　2 Sheets-Sheet 2
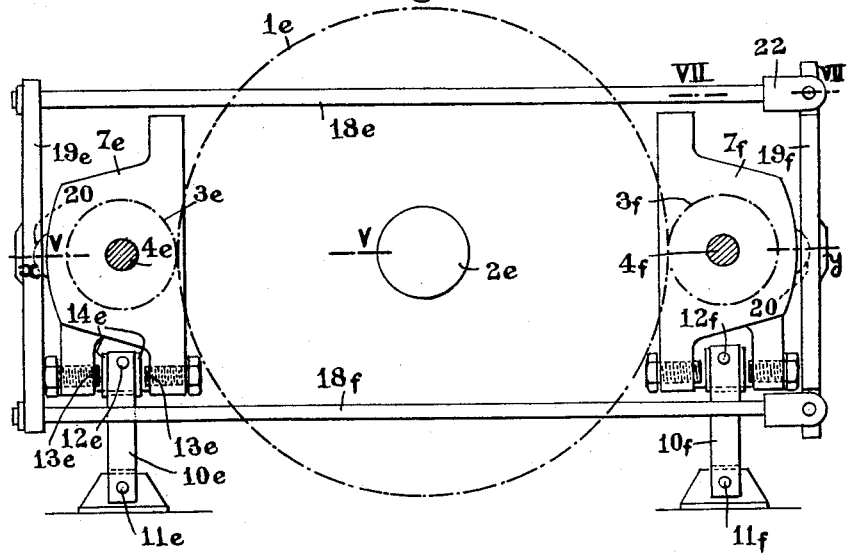
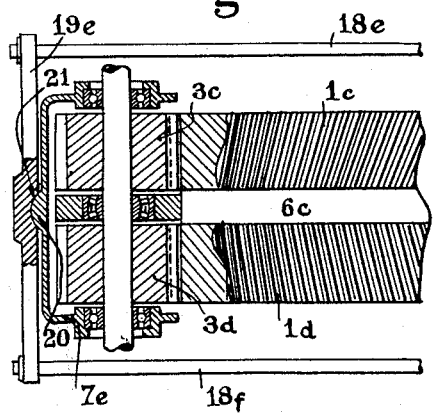
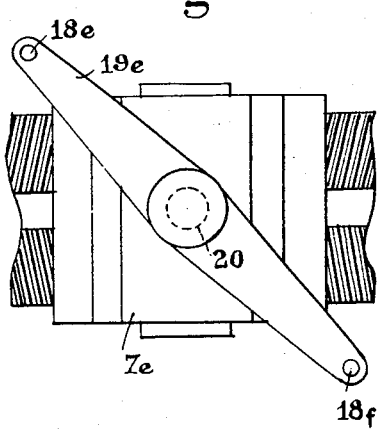
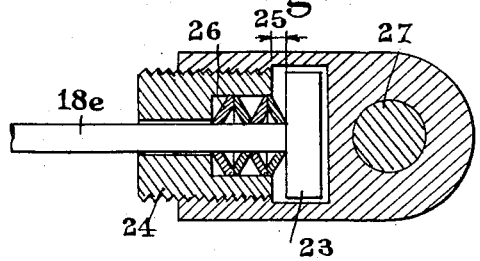
Inventor:
François Durand
by:
Michael S. Striker
Attorney 3,167,975
DEVICE FOR TRANSMITTING MOTION TO
A GEAR
François Durand, 108 Blvd. Carnot, Le Vesinet, France
Filed July 31, 1962, Ser. No. 214,105
Claims priority, application France, May 12, 1962,
897,368
7 Claims. (Cl. 74—665)

This invention relates to a device for transmitting motion through a pinion to a gear of relatively large size. More precisely, this invention has for its object to provide a transmission device for driving a gear by means of at least two pinions meshing in driving relation therewith, this being furthermore accomplished with automatic adjustment of the manner in which the teeth of each pinion mesh with those of said gear.

In this connection, the conditions for correct meshing between an involute pinion and gear are well known, being as under:

(1) The theoretical axes of the meshing teeth must lie in a same plane.

(2) Said axes must be parallel to each other in that plane.

(3) The distance between the two axes can vary within the limits compatible with variations in backlash.

When a gear is driven by a single pinion, the tooth running-in process and the elastic deformations of the gear and pinion mountings will enable the three abovementioned requirements to be fulfilled if they are not met at the outset. However, when two pinions are provided to drive a same gear, it is no longer possible to rely on the tooth running-in process, for although the latter may bring about the desired result on the teeth of one pinion it will generally not do so in the case of the other pinion.

The present invention has accordingly for its object to overcome this drawback and to ensure that each pinion of a two-pinion transmission system assumes the ideal position which allows it to satisfy the three requirements cited hereinbefore independently of the other pinion, this being achieved without setting up undue parasite (static) stresses as the result of elastic deformations of the supporting structure or of the mountings used for the gear and the pinions.

To this end, it is the object of this invention to provide a device for transmitting motions to a gear, comprising a driving pinion supported within a mobile mounting independent of the gear but provided with at least one roller which is concentric with said pinion and which rolls along a track concentric with the gear root circle, said device being characterized in that it is provided with at least two driving pinions which are respectively supported in a mounting of the type referred to and which are uniformly spaced about said gear, each mounting being linked, in a manner well known per se, to a fixed point by a coupling bar pivotally connected at its two extremities, and said two mountings being interconnected by at least one tie-rod provided with spring means which apply the rollers of each mounting against the guiding track on the crown gear, convenient stops adapted to leave sufficient freedom to each mounting being furthermore provided to co-operate with each mobile mounting.

In one specific embodiment, provision is made for two diametrically opposed driving pinions, and the coupling bars are positioned on one side of a plane passing through the axes of the pinions, the mountings of said two pinions being interconnected by a tie-rod which is positioned on the other side of said plane and which comprises spring means which bias the corresponding extremities of the mountings towards each other, thereby applying the rollers of said mountings against the guiding tracks, and a fixed stop being furthermore provided to co-operate with that extremity of each mounting which is remote from said interconnecting tie-rod so as to restrain that side of said extremity which is remote from the side of the driven gear.

Thus, the sprung interconnecting tie-rod applies the mounting rollers against the gear tracks while at the same time applying said mountings against the corresponding stops, which stops by no means prevent the coupling bar articulations from leaving sufficient freedom to the mountings to ensure that each pinion assumes the ideal position wherein it fulfills the conditions required for correct meshing between said pinions and the gear.

The description which follows of a number of alternative embodiments of the transmission device of this invention, given with reference to the accompanying drawing which is filed by way of example only and not of limitation, will give a clear understanding of how the invention can be carried into practice.

In the drawing filed herewith:

FIGURE 1 is a front elevation view of a first embodiment of the device according to this invention;

FIGURE 2 is a sectional view of said device, taken through the broken lines II—II of FIGURE 1;

FIGURE 3 is a similar fragmentary sectional view, on a different scale, of an alternative embodiment;

FIGURE 4 is a front elevation view of another alternative embodiment of the device according to this invention;

FIGURE 5 is a fragmentary sectional view taken through the lines V—V of FIGURE 4;

FIGURE 6 is a fragmentary side elevation view of said device;

FIGURE 7 is a sectional detail view taken through the lines VII—VII of FIGURE 4.

Referring first to FIGURES 1 and 2, the transmission device illustrated thereon is designed to drive a gear 1 supported on a shaft 2, through the medium of two pinions 3a and 3b. Said pinions are disposed on either side of the gear, in diametrically opposed positions on a diameter x–y of said gear. They are respectively driven by shafts 4a and 4b supported in cradle-shaped mountings 7a and 7b respectively, said shafts 4a and 4b being journaled in said mountings.

Each shaft 4a (or 4b) supports, on either side of the corresponding pinion 3a (or 3b), two rollers 5 positioned in contact with two guiding tracks 6 which are provided on the periphery of gear 1 and arranged on each side of the gear toothed rim 1a. Said two guiding tracks are disposed concentrically with said rim and the sum of the diameters of each roller 5 and its associated track 6 is equal to the sum of the pitch diameters of the pinion 3a (or 3b) and the gear 1.

The cradles 7a and 7b are respectively connected to fixed points 8a and 8b of the base-body 9 through coupling bars 10a and 10b respectively. Each of said bars is pivotally connected at both extremities 11 and 12, preferably by means of universal joints of the ball-joint type, or at least by means of pivotal connections which provide a measure of freedom in all directions. Said coupling bars can be replaced with advantage by load-measuring dampers.

It should be noted that said coupling bars are arranged to one side of the plane on which the axes of the two pinions 4a and 4b are located.

On the side of said plane remote from the coupling bars, the two cradles 7a and 7b are interconnected by a tie-rod 13, on the extremities of which are mounted springs 15a and 15b which urge the corresponding extremities of cradles 7a and 7b in the direction of arrows R (see FIGURE 1). Cooperating with that extremity of each cradle 7a (or 7b) which is remote from spring 15a (or 15b) is a fixed stop 14a (or 14b). Each such stop consists of a plate rigid with the structure 9, and each cradle bears against the corresponding stop through the medium of a spherically-shaped boss 13a (or 13b). The tie-rod 18, the coupling bars 10a and 10b and the spherical stops 13a and 13b are contained substantially in the median plane through the gear toothed rim 1a.

The springs 15a and 15b provided on tie-rod 18 urge the rollers 5 of each cradle 7a (or 7b) into pressure contact with the two guiding tracks 6. Said springs are so adjusted that they apply said rollers against the guiding tracks with a force R' greater than the spreading force E1 (or E2) exerted between each pinion and the gear. It should be noted that this results in cradles 7a and 7b having their spherical bosses 13a and 13b thrust against the fixed stops 14a and 14b. Thus the cradle serving as a mounting for each pinon possesses a sufficient degree of freedom to allow it to shift and thereby enable the associated pinion to be placed in the ideal position wherein the three requirements for correct meshing between the pinion and the gear are fulfilled.

It should be noted that the correct positioning of each pinion and its associated mounting is effected automatically until the conditions required for correct meshing are all satisfied. Thence forward the teeth of each pinion will coact with those of the gear in perfect manner. Of course, it will be well understood that the orientation of each mounting is automatically modified by a pivotal motion about the associated coupling bar which locks said mounting tangentially, said bar in turn pivoting about its hinge point 11 on the associated fixed point 8a (or 8b). This system therefore ensures correct meshing at all times of the teeth of each pinion with the teeth of the gear.

Referring now to FIGURE 3, there is shown thereon an alternative embodiment wherein the toothed rim 1b of the gear to be driven comprises two sections 1c and 1d disposed on either side of a single guiding track 6c which is concentric with said sections and which replaces the two tracks 6 utilized in the embodiment referred to precedingly. The toothed rim of the gear of this alternative embodiment is of the reversed double-helical type and can be likened to a herringbone gear.

Each driving pinion is in this case replaced by a pair of adjacent pinions 3c, 3d, which mesh with the toothed rim sections 1c and 1d. The cradle forming the mounting for each pair of pinions, as exemplified by cradle 7c (see FIGURE 3), comprises a single roller 5c positioned between the two pinions 3c and 3d and constrained into pressure contact with the guiding track 6c.

Said roller is preferably mounted on a self-aligning bearing 17. This makes it possible to achieve automatic balancing, without setting up parasite (static) stresses, between the spreading forces R'1, R'2 exerted between each pinion of a given pair of pinions and the associated toothed section of the gear, thereby ensuring automatic parallelism at all times between the cutting axes of the teeth on the pinions and gear in mesh.

However, since the remaining component parts of the transmission device remain identical to those of the device illustrated in FIGURE 1, the alternative embodiment of FIGURE 3 offers the same advantages as those enumerated precedingly.

Reference is now had to FIGURES 4 to 7, which illustrate another alternative embodiment of the transmission device according to this invention. This alternative form of construction is designed to considerably reduce the bending moment which is set up in the cradles 7a and 7b of the preceding embodiment, due to the reaction of tie-rod 18 which takes up the spreading force between the pinions. This specific embodiment is likewise calculated to reduce the forces that were previously exerted on the rollers 5 or 5c when the driving pinions transmit only a small part of the rated power.

In this alternative method of construction, the cradles 7e and 7f which form mountings for the two driving pinions 3e and 3f are interconnected by two tie-rods 18e and 18f positioned on either side of the gear 1e to be driven. Through the instrumentality of beam-levers 19e and 19f, said tie-rods bear upon the two cradles 7e and 7f at a point located substantially on the line of intersection of the median plane taken through the toothed rim of the gear with the plane containing the two pinion shafts 4e and 4f.

To this end, the outer face of each cradle 7e and 7f embodies a spherically contoured boss 20 located at the designed contact point. The associated beam-lever 19e (or 19f) is provided with a matching hollow 21 adapted to co-operate with said boss and to constitute therewith a form of ball-joint.

The respective beam-levers 19e and 19f interconnect the corresponding extremities of the two tie-rods 18e and 18f. However, in order to prevent said tie-rods from intersecting the gear shaft 2e, tie-rods 18e and 18f are respectively arranged on opposite sides of the plane which passes through the axes of the two pinions each beam-lever being thus disposed in an inclined position (see FIGURE 6).

The fact that the spreading force exerted between the pinions is taken up by articulations 19–20 which are located substantially on the line of intersection of the median plane taken through the gear toothed rim with the plane containing the two pinion shafts, prevents the cradles 7e and 7f from being subjected to bending forces, as was the case with the arrangement shown in FIGURES 1 and 2. Furthermore, the torque reactions in the cradles 7e and 7f about the pinion shafts 4e and 4f are in turn considerably reduced. As a result, the fixed stops 14a and 14b provided in the previous embodiment can be replaced by stops which are positioned on the coupling bars 10e and 10f to immobilize each cradle tangentially. The purpose of these stops is to limit the rotation of the articulations 11e, 12e, 11f, and 12f of coupling bars 10e and 10f in the median plane through the toothed rim. Thus, the corresponding extremity of each coupling bar can be provided with stops 14e co-operating with adjustable thrust screws 13e carried by each cradle 7e (or 7f) and placed astride the associated coupling bar.

Of course it will be appreciated that when these stops come into play between the coupling bars and the pinion mountings, a bending moment will be set up in each coupling bar 10e (or 10f). This will be be acceptable, however, since these bending moments will be very small as they can arise only through small errors of alignment of the coupling bars 10e and 10f and the articulations 19–20 of beam-levers 9e and 9f with reference to their theoretical positions, in which positions the pinion mountings 7e and 7f have no reaction torques about the shafts 4e and 4f of pinons 3e and 3f. In this particular embodiment, the gear 1e can be provided with a double toothed rim 1c, 1d, as in the example of FIGURE 3 (see FIGURE 5). Each pinion mounting in this case supports a single roller 5e in contact with a single guiding track 6c provided between the two toothed rim sections of the gear.

In order to reduce the loads on rollers 5c when pinions 3e and 3f are rotating and transmitting only a small part of the rated power, at least one extremity of one of the tie-rods 18e (or 18f) is attached to the beam-lever 19e (or 19f) through the medium of spring means, as illustrated in FIGURE 7. Each tie-rod 18e, 18f is connected to beam-lever 19f through a clevis 22 which is pivotally connected to a peg 27 rigid with the beam-lever. Into said clevis is engaged the head of the corresponding tie-rod, a spring 26 being inserted between said tie-rod head and a nut 24 which plugs clevis 22. Said nut allows for adjusting the clearance 25 which provides the required spacing between pinions 3e and 3f and their associated rollers 5c when the spreading force exerted between the pinions and the gear compresses springs 26.

In their inoperative positions, springs 26 apply rollers 5c against track 6c. When a torque is applied either to the gear shaft or to pinion shafts 4e and 4f, the clearances are taken up between pinions 3e, 3f and gear 1e. Spreading forces are set up which compress springs 26 and thereby take up the clearances 25. The two pinions 3e and 3f are thus spread apart and the rollers 5c shifted off the track 6c.

The apportionment of this spacing, between the pinion 3e and the pinion 3f, with reference to the centre of the gear will be adjusted automatically in terms of the difference between the respective backlashes in each of pinions 3e and 3f and gear 1e so as to ensure an equal spreading force between each of said pinions 3e and 3f and gear 1e. The springs 26 can be so adjusted that they be compressed when pinions 3e and 3f transmit 10% of the nominal power. Thus the system executed in accordance with FIGURE 7 will allow for relieving the load on rollers 5c as soon as the magnitude of the power transmitted exceeds a determinate fraction of the rated power.

While there has been shown and described, the presently preferred embodiments of the transmission device of this invention, it will be well understood by those skilled in the art that various changes and modifications may be made in these embodiments. By way of example, the transmission device could comprise more than two driving pinions, regularly spaced about the rim of the gear to be driven and interconnected by tie-rods, their swivelling motion being limited by stops, as in the embodiments hereinbefore described; similarly, the rollers concentric with the pinions could be replaced by pairs of rollers supported on beam-levers pivoting about the pinion shafts. It is, therefore, to be understood that the description hereinbefore set forth is not to be considered a limitation of the invention but that changes may be made within the spirit and scope of the invention, as set forth in the appended claims.

What I claim is:

1. A device for transmitting motion to a gear provided with peripheral teeth and mounted on a fixed base body, comprising, in combination, at least two driving pinions uniformly spaced about said gear and meshing with the teeth thereof; at least two mountings spaced from said base body and respectively turnably supporting said pinions; at least one guiding track provided on said gear arranged concentrically to the teeth thereof; at least one roller supported by each of said mountings, coaxially arranged with the driving pinion supported thereon and engaging said guiding track; a pair of coupling bars respectively connecting said mountings to fixed points of said base body which are spaced from each other, said bars being adapted to restrain said mountings tangentially with respect to the gear, each of said bars being pivotally connected at opposite ends therof to the respective mounting and the respective fixed point; at least one tie-rod interconnecting said two mountings; spring means provided on said tie-rods for urging said two mountings toward each other and to keep said rollers in engagement with said guiding track; and at least one fixed stop for each of said mountings and cooperating therewith to limit the motion thereof.

2. A transmission device according to claim 1, wherein said driving pinions are diametrically opposite arranged and said coupling bars are positioned to one side of a plane passing through the axes of said pinions, said tie-rod being positioned on the opposite side of said plane and said spring means urge the corresponding extremities of said mountings towards each other and thereby apply the rollers of said mountings against said guiding track, said fixed stops being furthermore arranged to respectively co-operate with that extremity of each mounting which is remote from the interconnecting tie-rod in order to restrain said extremity on that side of the mounting which is remote from the side of the driven gear.

3. A device according to claim 2, wherein each mounting abuts against the corresponding fixed stop through the medium of a spherical boss provided on said mounting.

4. A device according to claim 1, wherein two diametrically opposed pinions are interconnected by two tie-rods positioned on either side of the gear, the corresponding extremities of said tie-rods being interconnected by a beam-lever which bears against that face of the corresponding mounting which is remote from the gear, at a point thereon which is located substantially on the line of intersection of the median plane taken through the toothed rim of the crown gear with the plane taken through the axes of the two pinions.

5. A device according to claim 4, wherein each mounting comprises a spherical boss at the thrust point of the corresponding beam-lever, said beam-lever in turn embodying a matching hollow adapted to co-operate with said boss and to constitute therewith a ball-joint.

6. A device according to claim 4, wherein stops are provided between each coupling bar and the corresponding mounting in order to limit the amplitude of the relative pivotal motion of these parts, said stops comprising adjustment screws provided on the corresponding extremity of each mounting and positioned astride the corresponding coupling bar so as to butt against one of the faces thereof.

7. A device according to claim 1, wherein the toothed rim of the gear is formed in two separate sections between which is disposed said single concentric guiding track, and in which each pinion mounting comprising only a single roller which is concentric with the corresponding pinion and which rolls along said single guiding track.

References Cited by the Examiner
UNITED STATES PATENTS 2,337,501 12/43 Schmidt _____ 74—410
2,431,428 11/47 Semar _____ 74—410
2,995,046  8/61 Mansachs _____ 74—410

DON A. WAITE, *Primary Examiner.*